A. C. TAYLOR.
METHOD OF ELECTRICALLY WELDING IN SERIES.
APPLICATION FILED NOV. 28, 1921.
1,435,994.
Patented Nov. 21, 1922.
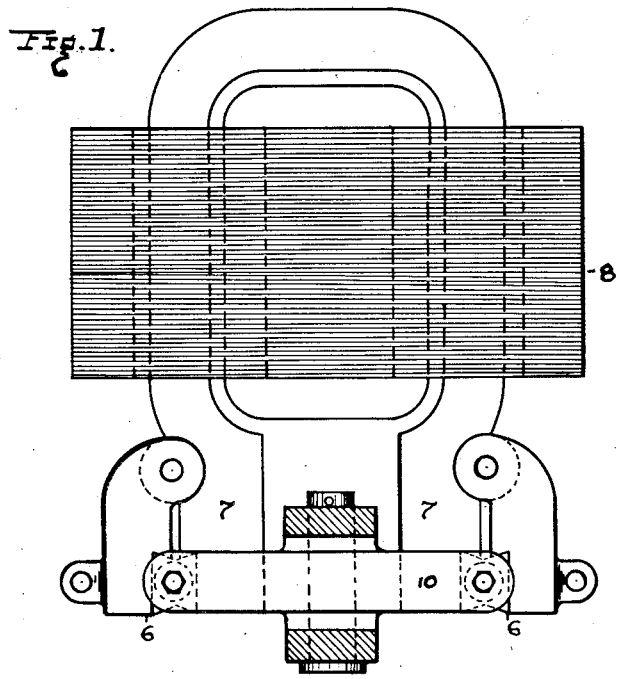
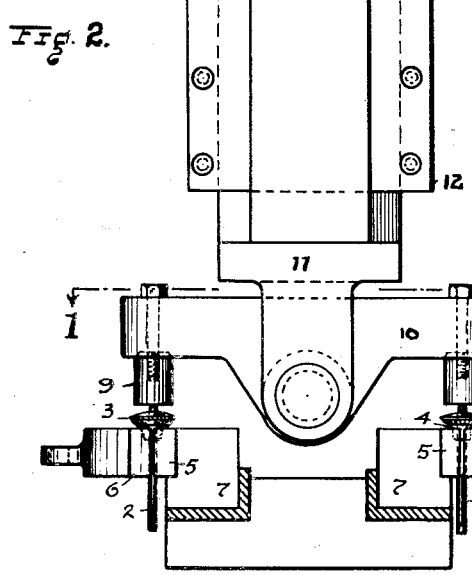
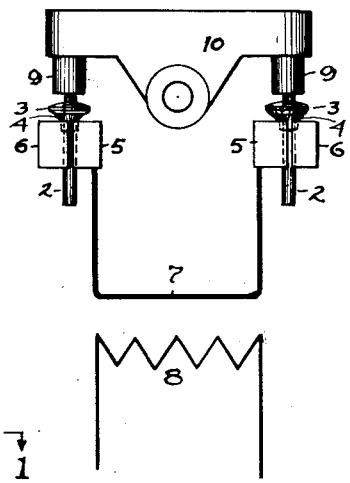
Inventor
ALBERTIS C. TAYLOR.
Attorneys

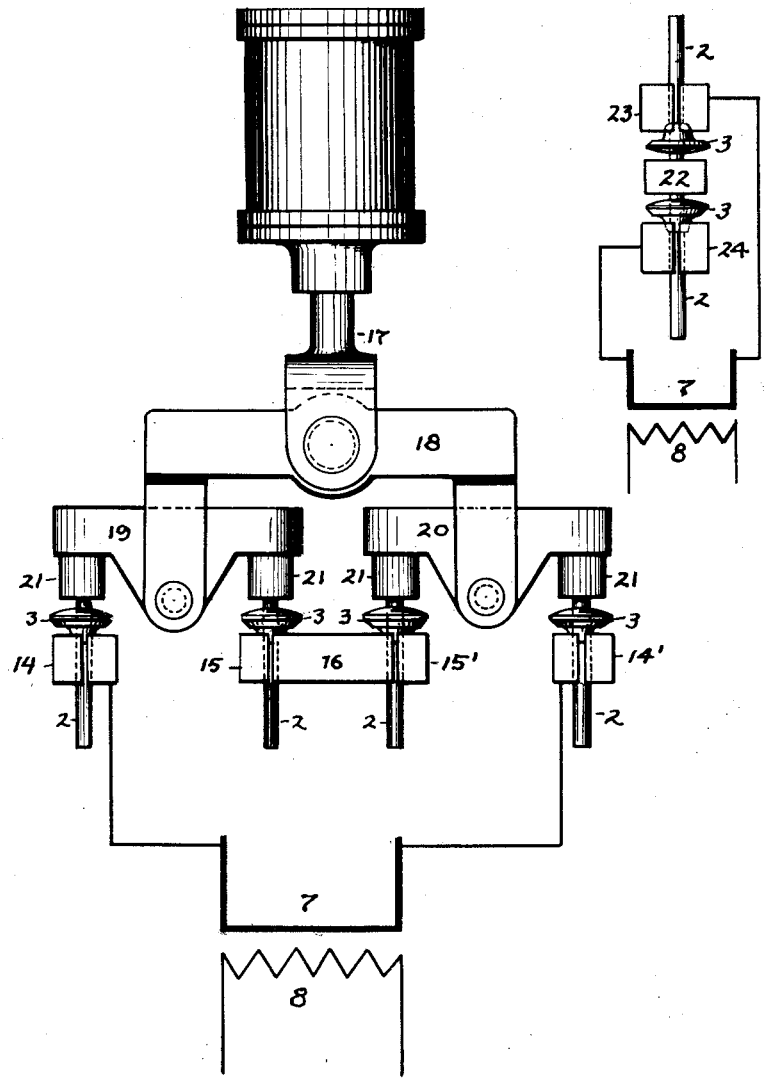

Patented Nov. 21, 1922.

1,435,994

UNITED STATES PATENT OFFICE.

ALBERTIS C. TAYLOR, OF WARREN, OHIO.

METHOD OF ELECTRICALLY WELDING IN SERIES.

Application filed November 28, 1921. Serial No. 518,205.

*To all whom it may concern:*

Be it known that I, ALBERTIS C. TAYLOR, a citizen of the United States, residing at Warren, in the county of Trumbull and State of Ohio, have invented certain new and useful Improvements in a Method of Electrically Welding in Series, of which the following is a specification.

This invention relates more particularly to a method of welding a plural number of units of sleeved parts at the same time in the same circuit; and the invention is of especial utility in welding together the heads and stems of valves for internal combustion engines, for example, valves having stems and heads made of different metals and sleeved together. In general, my object is to provide an efficient method of simultaneously welding the assembled parts of two or more articles made of separate parts, using electric current of large volume and low voltage from a transformer and placing all the parts in series in the secondary circuit; in this way, reducing the labor and manufacturing cost and the number and cost of machines for doing a corresponding amount of work, and at the same time providing a more efficient method and machine as compared with known practices and machines.

In the annexed drawing, Fig. 1 is a plan view of a welding machine for practicing my method, this view being partly in cross-section on line 1—1 of Fig. 2, which latter figure is a front view of the same machine operating on two units or pieces of work. Fig. 3 is a diagram of the welding circuit, and Fig. 4 shows a modified form of machine and diagram for welding four valves at the same time, the pressure and current being equally divided between all the welds. Fig. 5 is a diagram of a welding circuit with two valve units engaging opposite sides of a stationary block.

In practicing my method and applying it to the welding of engine valves, the first step involves the placing of the valve stem 2 into a central round opening in a disk-shaped head 3 made of cast-iron, alloy or other metal. This head is usually provided with a boss 4 at its bottom side, and the two pieces or parts composing this unit are clamped between a fixed jaw 5 and a pivoted jaw 6 forming parts of the extremity of one of the legs of a solid U-shaped copper member 7 forming the secondary of a welding transformer in which the primary winding is represented by —8— in the several figures in the drawings. Each leg of the secondary is thus equipped with a pivoted clamping jaw or member 6, thus permitting two separate units to be gripped and held parallel and vertically immediately beneath two spaced upsetting electrodes or dies 9—9 secured at the opposite ends of a heavy equalizing bar 10 made of copper or other good electric conducting material. As shown in Figs. 1 and 2 this bar is pivotally suspended at its middle upon the bottom end of a plunger 11 mounted to slide vertically in an over-hanging part 12 of the machine. Any suitable means may be used to operate the plunger to apply the necessary pressure in welding operations, it being understood that when the plunger is lowered the electrodes or dies 9 will engage and apply the pressure to the short exposed ends of the two valve stems 2 in equal degree, thereby placing both valve units in series in the welding circuit of which the solid secondary 7 and the solid equalizing bar 10 form essential parts. When both stems are engaged by dies 9 and the welding circuit is complete, a large volume of electric current of low pressure is turned on which heats each stem instantly, and then as pressure is applied through plunger 11 each stem is compressed the full length of the opening in the valve head and the extending upper end is upset and a head formed on the stem above its respective valve head. As the head on each stem is being formed it overlaps the valve head and the pressure from plunger 11 is thus also applied to the valve head, thereby effecting perfect electrical contact of the valve head with the stem at all points and causing the heating current to pass through the valve head so as to weld the valve parts solidly together in their meeting surfaces.

Welding of the two valve units occurs simultaneously, the welding point of both valves being reached at the same time since the electric current has a tendency to equalize, that is, one weld cannot possibly receive any more current than the other. Furthermore, as both welds are under equal pressure, should one valve have a tendency to heat faster than the other, it would be the first one to upset and increase the area of contacting surface with its electrodes thus diverting some of the current into new paths and reducing the heating effect of the current in that particular valve. In welding two valves simultaneously in this manner the heating of the valves is equalized and made uniform and the operator is not required to inspect both valves but need only observe one valve to see when the welding temperature has been reached. In contradistinction, in welding two or more valves at one time using two transformers or using parallel circuits instead of in series, the operator would have to watch all the welds and experience the same difficulty as a blacksmith with too many irons in the fire.

The use of a solid secondary to support the two valves in series with the pressure bar avoids loss of current and permits effective welds to be made in two or more valve units at the same time. As an exemplification of the possibilities of the invention I show in Fig. 4 four sets of electrodes electrically connected in series in the secondary circuit of a welding transformer. Thus, the end clamps 14—14' are affixed to the extremities of the solid secondary of the transformer, and the clamps 15—15' situated in the same horizontal plane intermediate said end clamps comprise a short conductor bar 16 which becomes part of the secondary circuit when the plunger 17 is lowered and the triad of equalizing bars 18, 19 and 20 come into action to equalize the pressure on the four valves through the four electrodes or dies 21 on the lower equalizing bars 19 and 20 and it will be noted that the latter bars are also placed in series.

In Fig. 5 the respective valve stems 2 of a pair of valve units are placed axially in line on opposite sides of a copper block 22 and held in separate movable clamps 23 and 24 connected in series with the secondary 7 of the transformer.

My method of welding is not necessarily limited to the welding of valve heads and stems together, but may be utilized to weld metal parts of any description or kind and particularly where one part is inserted into another part and it is desired to weld the meeting surfaces together.

What I claim, is—

1. A method of welding consisting in passing an electric welding current through a plural number of sets of parts in series until a welding temperature has been reached, while applying equal pressure to said sets of parts simultaneously.

2. A method of welding sleeved elements together consisting in passing a large volume of current of low pressure through a plural number of sets of sleeved parts in series until a welding temperature has been reached, while applying equal pressure simultaneously to the respective sets of parts.

3. A method of uniting metal heads to stems consisting in passing a welding current through a plural number of sets of such heads and stems in series, while upsetting the stems initially under equal pressure and then continuing the application of said current and pressure until a welding temperature and union has been obtained.

4. A method of uniting valve heads to stems consisting in subjecting separate sets of such parts while under a heavy equalizing pressure to a welding current passing through corresponding valve parts in series.

5. A method of uniting valve heads to stems, consisting in clamping separate sets of assembled heads and stems in series in an electric welding circuit and applying an equalizing pressure on all the stems while passing a welding current through said circuit, first through corresponding stems and then through corresponding heads and stems.

6. A method of uniting valve heads to stems, consisting in clamping separate sets of such assembled parts directly to the opposite legs of a single U-shaped secondary of a transformer and in passing an electric heating current through said separate sets of parts in series while subjecting said parts to an equalizing welding pressure.

7. A method of uniting valve heads to stems, consisting in sleeving separate valve heads upon separate stems; in mounting said assembled valve units separately upon the opposite rigid ends of a U-shaped secondary of a transformer; in applying a pivoted equalizing bar upon said units to complete the secondary circuit; and in applying an equalizing pressure through the pivot of said bar while passing a welding current through said parts.

8. A method of uniting valve heads to stems, consisting in placing separate sets of stems and valve heads in sleeved relation within separate clamping devices forming part of a secondary transformer circuit; in passing a welding current in series through said sets of assembled valve elements; and in applying an equalizing pressure first on the separate stems and then upon both the heads and stems.

In testimony whereof I affix my signature in presence of two witnesses.

ALBERTIS C. TAYLOR.

Witnesses:
EDW. M. RAY,
MARGARET CAMPBELL.